United States Patent [19]
Anderson

[11] 3,784,908
[45] Jan. 8, 1974

[54] ELECTRICAL CONDUCTIVITY MEASUREMENT METHOD AND APPARATUS

[76] Inventor: Weston Arthur Anderson, 763 La Para Ave., Palo Alto, Calif. 94306

[22] Filed: Apr. 9, 1973

[21] Appl. No.: 348,913

[52] U.S. Cl................ 324/62, 128/2.1 Z, 324/189
[51] Int. Cl............................................ G01r 27/02
[58] Field of Search.................... 324/62, 78 E, 189; 128/2.1 Z

[56] References Cited
UNITED STATES PATENTS

| | | | |
|---|---|---|---|
| 2,504,848 | 4/1950 | Kunz, Jr.............................. | 324/62 R |
| 3,209,251 | 9/1965 | Edgington et al................. | 324/78 E |
| 3,316,896 | 5/1967 | Thomasset..................... | 324/62 R X |
| 3,320,946 | 5/1967 | Dethloff et al................... | 128/2.1 Z |
| 3,648,686 | 3/1972 | Payne............................... | 128/2.1 Z |

Primary Examiner—Stanley T. Krawczewicz

[57] ABSTRACT

A method and apparatus is disclosed for minimization of the effect of contact potential and polarization at the electrodes while making electrical conductivity measurements of animal tissue samples. A current driven by an alternating polarity voltage source is passed through the sample. The polarity of the voltage source is reversed after a predetermined amount of charge has passed through the sample such that in one complete cycle equal amounts of charge have passed through the sample in opposite directions. The value of the sample conductivity is determined by the frequency of the alternating polarity voltage source.

11 Claims, 3 Drawing Figures

PATENTED JAN 8 1974                              3,784,908

ELECTRICAL CONDUCTIVITY MEASUREMENT METHOD AND APPARATUS

BACKGROUND OF THE INVENTION

Electrical conductance, i.e. the ability of an object to conduct an electrical current, is defined by the equation:

$$G = I/V \qquad (1)$$

where $G$ is the electrical conductance in units of mhos, $V$ is the electromotive-force in units of volts, and $I$ is the electrical current in units of amperes. Electrical conductance is the reciprocal of electrical resistance.

Electrical conductance measurements of animal tissue have been found useful in many physiological measurements. Impedance plethysmography has been used to measure pulse rate and blood flow to the extremities of animals. In this technique a DC (direct current) or AC (alternating current) electrical bridge circuit is used with one arm of the bridge containing an intact animal connected by two electrodes usually at two different extremities. Changes of electrical conductance measured by the bridge are related to the changes of volume of blood flowing to the extremities during the cardiac cycle. Impedance pneumography is a technique that has been used to measure respiration activity of animals by measuring changes of electrical conductance across the torso. These changes are due to varying electrical conductance resulting from the expansion and contraction of the torso during the respiratory cycle. Galvanic skin resistance techniques measure changes in electrical skin resistance which are affected by sweat gland activity and have been used to monitor resistance changes due to emotional arousal in animals. A brief review of these measurement techniques can be found in the book "Biophysical Measurements", by Peter Strong, Tektronix, Inc., 1970.

It has been found that acupuncture points are associated with points of maximum electrical skin conductivity. In this application one contact is made to the animal with a fixed electrode of large area while a second electrode of small area is moved over the skin surface. In some electrical conductance instruments a variable pitched tone is provided to indicate the relative conductance values as the second electrode is moved. Dr. William Tiller has reviewed this application in the article "Some Physical Network Characteristics of Acupuncture Points and Meridians", Transcript of the Acupuncture Symposium at Stanford University, June 17, 1972, published by The Academy of Parapsychology and Medicine, Los Altos, Cal., 1972.

Electrical conductivity of animal tissue presents problems not encountered in measurements of electrical conductance measurements of electronic components. Most of these problems are associated with contact potentials and polarization effects that occur at or near the electrodes that are used to make contact to the animal tissue. Tissue contact potentials depend upon the electrode material, the tissue composition, and the temperature. These potentials, which may be several hundred millivolts, add to the internal potentials of prior art DC conductance meters causing erroneous measurements. Electrode polarization, which occurs in DC conductance meters, is the formation of a dipole layer just next to the electrodes causing an apparent decrease in electrical conductance. These problems have been largely, but not completely, overcome by AC bridge circuits, but with the commensurate increase of circuit complexity and increased complexity of operation.

SUMMARY OF THE INVENTION

The present invention provides for improvement in electrical conductance measurements of animal tissue samples by enabling the passage of a predetermined amount of charge through the sample in opposite directions on alternate half cycles so that, after one complete cycle of charge flow, no net charge enters the sample through the contacting electrodes, and by utilizing the frequency of the charge flow as an indication of the sample conductivity.

The purpose of the invention is to enable electrical conductance measurements of animal tissue samples that minimize measurement errors due to contact potentials at the interface between the sample and the contraction electrodes. Another purpose of the invention is to minimize the effect of electrode polarization. Another purpose of the invention includes the above purposes and is to provide a low cost apparatus to obtain accurate and reproducible electrical conductance measurements of animal tissue samples. Another purpose of the invention is to provide an easy-to-use method of obtaining electrical conductance measurements of animal tissue samples.

DETAILED DESCRIPTION OF THE INVENTION

The disclosed invention enables electrical conductance measurements of animal tissue with improved accuracy and reproducibility yet with simplicity of instrumentation and operation.

Figure 1:
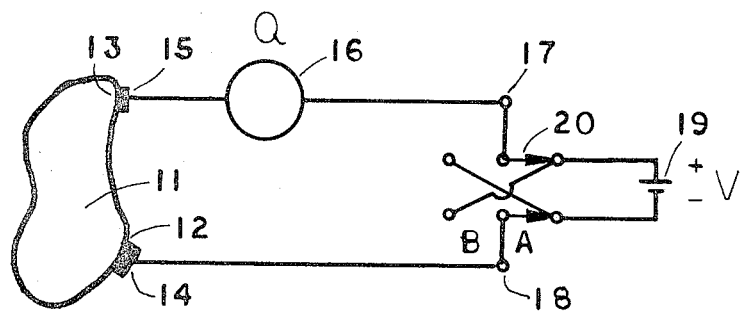
FIG. 1 is an explanatory schematic diagram to illustrate the principles of electrical conductance measurements made in accordance with the present invention.

FIG. 1 is a schematic diagram that illustrates the principle of operation of the invention. An electrical conductance measurement is made on the animal tissue 11 between the two points 12 and 13 where contact is made with the two contacting electrodes 14 and 15. One of the electrodes 15 is connected in series with a meter 16 that measures the total charge, Q, that flows through the series circuit that includes the meter 16 and the animal tissue 11. The meter 16 may be, for example, a galvanometer with zero restoring force (ballistic galvonometer) or a capacitor with a voltage measuring means as is described more fully with respect to FIG. 3. The meter 16 and electrode 14 are connected to a switchable voltage source with terminals 17 and 18. The switchable voltage source consists of the voltage source 19 and the polarity reversing switch 20. The internal conductance of the voltage source 19 is small when compared to the conductance of the tissue sample to be measured and the voltage source 19 may be, for example, a 1-½ volt battery. With the polarity reversing switch 20 in the position A as indicated, the positive terminal of the voltage source 19 is connected to terminal 17 and to meter 16; the negative terminal is connected to terminal 18 and to electrode 14. With the polarity switch 20 in position B, the negative terminal of the voltage source 19 is connected to terminal 17 and to the meter 16 while the positive terminal is connected to terminal 18 and to electrode 14.

Figure 2:
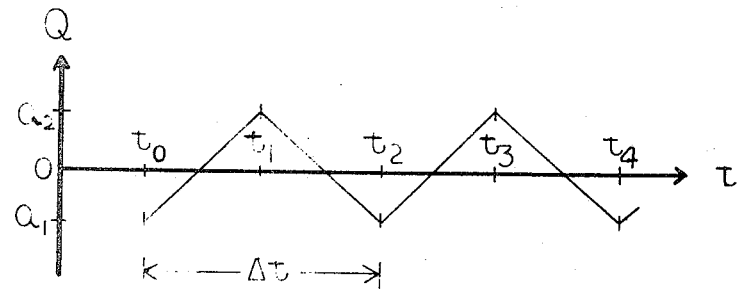
FIG. 2 illustrates the flow of charge that occurs in an electrical conductance measurement made in accordance with the present invention.

The operation of the electrical circuit shown in FIG. 1 is illustrated with the aid of FIG. 2 which shows the charge reading of the charge meter 16 as a function of time. Assume that at time $t_0$ contact is made to the animal tissue 11 with the two electrodes 14 and 15 and that the initial reading of the meter 16 is $Q_1$. Charge then flows through the meter 16 and into the animal tissue 11 at the electrode 15. When a predetermined amount of charge, $Q_2 - Q_1$, has passed through the meter 16, the polarity switch 20 is moved from position A to position B. In FIG. 2 this occurs at time $t_1$. At time $t_2$ when meter 16 indicates the initial charge reading $Q_1$, the switch 20 is moved back to position A. The conductance of the animal tissue is then given by the formula $$G = 2(Q_2 - Q_1)/V(t_2 - t_0)(1 - K^2) \qquad (2)$$

with $$K \equiv [t_2 - t_1 - (t_1 - t_0)]t_2 - t_0 = V_c/V \qquad (3)$$

Here $V_c$ is the total contact potential, i.e. the algebraic sum of the contact potentials at the two contacts 12 and 13. By measuring the two time intervals $t_2 - t_1$ and $t_1 - t_0$ and knowing the source voltage $V$ and charge difference $Q_2 - Q_1$, the exact value of the electrical conductance $G$ and the value of the contact voltage $V_c$ are determined. In many cases the ratio of $V_c/V$ may be sufficiently small to allow the use of the simplified formula obtained by setting $K = 0$ in Eq. 3, i.e.

$$G = 2(Q_2 - Q_1)/V \Delta t \qquad (4)$$

where $\Delta t$ is the time taken to complete one complete cycle, being $t_2 - t_0$ for the example considered. If the ratio $V_c/V = 0.20$, the error made by using Eq. 4 is only 4 percent, whereas a 20 percent error would have been made in a prior art direct current conductance meter.

The operation of FIG. 1 has been explained using the initial charge value indicated by the meter 16 as one of the values at which switch 20 was changed. In practice arbitrary values of $Q_1$ and $Q_2$ may be selected which determine when switch 20 is turned from position B to A and A to B. The corresponding time interval $\Delta t$ is then chosen after a few cycles of operation.

Figure 3:
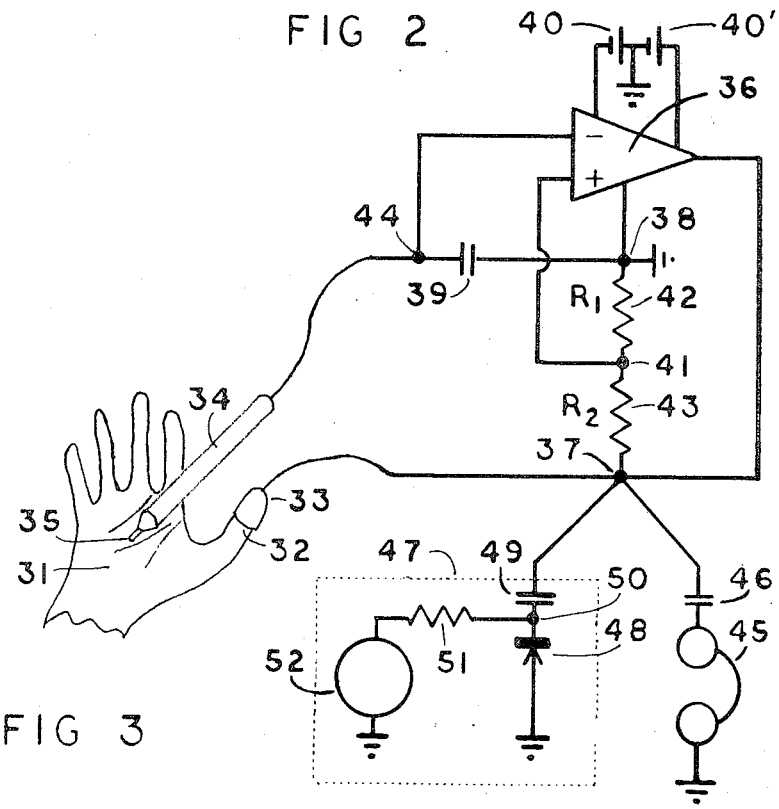
FIG. 3 is a schematic diagram of an embodiment of an electrical conductance instrument in accordance with the present invention.

In another embodiment of the present invention shown in FIG. 3 the polarity of the voltage source is automatically switched when a predetermined amount of charge has moved in one direction, and then reversed again after the same amount of charge has flowed in the opposite direction. In this example the animal tissue is illustrated by the human hand 31. One contact covers a substantial area of the thumb 32 and is made by the thimble electrode 33 which is slipped over the thumb. The second contact point is on the palm of the hand and is made with a movable probe with insulated handle 34 and the electrode tip 35 which has a small contact area compared to the thimble electrode 33. The switchable voltage source is the saturated output of the operational amplifier 36 and appears between the output terminal 37 and the ground terminal 38. The operational amplifier 36 typically has a voltage gain greater than 100 and may be, for example, a Fairchild type uA 741 operated with two voltage sources, 40 and 40', each with a voltage of 6 to 12 volts. The saturated output voltage of this amplifier is approximately 1 volt less than the power supply voltages. The capacitor 39 serves to accumulate the charge flowing through the movable electrode tip 35. The voltage across the capacitor is equal to the accumulated charge divided by the capacitance.

The non-inverting input terminal 41 of the operational amplifier 36 is maintained at a potential between that of the amplifier output 37 and ground 38 by means of resistors 42 and 43 having values $R_1$ and $R_2$ respectively. The value of these resistors may be, for example, ten thousand ohms each.

Operation proceeds as follows: Assume initially there is no voltage across the capacitor 39 and the amplifier output terminal 37 is saturated at $-5$ volts with respect to the ground terminal 38. With no current flowing through the electrodes 33 and 35 the amplifier will remain in this saturated condition as the non-inverting input 41 of the amplifier is negative with respect to the inverting input 44, maintaining the output at its maximum negative value. If contact is now made to the animal tissue 31 with the contacting electrodes 33 and 35, charge will flow through the animal tissue until the voltage on the inverting terminal 44 is slightly more negative than the non-inverting terminal 41. At this time amplifier 36 switches so that the output terminal 37 now becomes saturated at a positive output voltage. The current now flows in the reverse direction through the animal tissue, charging the capacitor 39. When the voltage of the inverting terminal 44 is slightly more positive than the non-inverting terminal 41, the amplifier once more switches so the output terminal 37 is again negative and the cycle repeats. Let $V_p$ be the output voltage of the amplifier 36 when it is saturated in the positive direction and $V_n$ be the corresponding voltage when it is saturated in the negative direction. Using the infinite gain approximation for the amplifier, the total charge flow during each half cycle is then $$Q = C(V_p - V_n) R_1/(R_1 + R_2)$$

and the net charge flow during a full cycle is zero. The time taken to complete one full cycle of operation is inversely proportional to the conductance, $G$, of the animal tissue, i.e. the frequency of the oscillating charge is directly proportional to the animal tissue conductance, $G$.

The operational amplifier 36 is chosen to have a high input impedance so that neglectable currents flow in the input leads of the amplifier. Thus during one complete cycle of operation no net charge is deposited at either contacting electrode 33 or 35.

An output tone with a frequency proportional to the conductance, $G$, is easily produced by coupling the earphones 45 to the amplifier output terminals 37 and 38 with a series coupling capacitor 46.

Alternately or in conjunction with a tone output a meter indication which can be calibrated in conductance units is obtainable by connecting the amplifier output terminals 37 and 38 to the input of a frequency meter. One such frequency meter circuit is shown within the dotted lines 47 of FIG. 3. This circuit works as follows: Whenever the voltage at the amplifier output terminal 37 changes from its positive saturated value to its negative saturated value, current flows through diode 48 in its forward (conducting) direction to quickly charge capacitor 49, reducing the potential at terminal 50 to ground potential. Very little charge flows through resistor 51 and microamperemeter 52. Whenever the voltage at the amplifier output terminal 37 changes from a negative value to a positive value, the voltage at capacitor terminal 50 becomes positive and then discharges through the resistor 51 and microamperemeter 52 since the diode is non-conducting in this direction. The value of the product of the resistance of resistor 51 and the capacitance of capacitor 49 is chosen to be small compared to the period of one full cycle of charge flow.

This instrument can be used to determine points of maximum electrical skin conductivity by placing thimble electrode 33 on the subject's thumb 32 or by making electrical contact to any other point on the subject with an electrode having a contacting area larger than that of the movable electrode tip 35. The operator holds the movable probe by the insulated handle 34 and slowly moves the electrode tip 35 over the skin surface of the subject while listening to the tone through the earphones 45. Care is taken to maintain a constant pressure between the electrode tip 35 and the surface of the skin. As the electrode tip 35 encounters regions of higher electrical skin conductivity, the pitch of the tone becomes higher in frequency. When a point of maximum conductivity is found it may be desirable to note the conductivity value by reading the meter 52.

In prior art alternating current conductance bridges provision is not normally made to insure zero net charge flow in the presence of contact potentials. The circuit of FIG. 3 uses less elements and is therefore more economical to construct than an alternating current bridge circuit that has provision for both meter and tone responsive outputs. The circuit of FIG. 3 also offers simplicity of operation as no adjustments need to be made during normal use as the meter output is direct reading and the pitch of the tone automatically follows the conductance variations as the electrode tip 35 is moved over the tissue sample.

Since this invention has been disclosed and illustrated with specific methods and apparatus, and since many changes will be apparent to persons skilled in the art, the invention is to be limited only as indicated by the scope of the appended claims.

I claim:

1. The method of indicating electrical conductance between two points of animal tissue which form an electrical current path comprising the steps of:
   a. making electrical contact to said animal tissue at each of said two points,
   b. flowing a predetermined amount of charge through said electrical current path in one direction,
   c. subsequently flowing a substantially equal amount of charge through said electrical current path in the opposite direction to form one cycle of charge flow, and
   d. determining the time required to form one cycle of charge flow.

2. The method of claim 1 wherein the step of determining comprises activating an audio frequency sound in response to the alternating flow of electrical charge.

3. The method of claim 1 wherein the step of determining comprises activating a meter in response to the frequency of said alternating flow of electrical charge.

4. The method of claim 1 wherein the steps of flowing charge in said one direction and subsequently in said opposite direction comprise the steps of establishing a potential difference across said animal tissue, measuring the charge flow through said current path in one direction, reversing the polarity of said potential difference after a predetermined amount of charge flow, and measuring the charge flow through said current path in the opposite direction.

5. The method of claim 1 wherein the steps of flowing charge in said one direction and subsequently in said opposite direction comprise the steps of alternately charging an electrical capacitor to a first and a second predetermined voltage levels with an electrical current, passing the said electrical current through said electrical current path, deriving said electrical current from a voltage source which can be switched to a first and a second voltage value, and switching said voltage source from the first value to the second value when the capacitor reaches the said first predetermined voltage level, and switching said voltage source from the said second value to the first value when the capacitor reaches the said second predetermined voltage level.

6. The method of claim 1 wherein the step of making electrical contact to said animal tissue at each of said two points comprises making contact to the first point with a fixed electrode, and making contact to the second point with a movable electrode having a contacting area less than that of the fixed electrode.

7. Apparatus for indicating electrical conductance between two points of animal tissue which form an electrical current path comprising:
   a. means for making electrical contact to said animal tissue at each of said two points,
   b. means for flowing a predetermined amount of charge through said electrical current path in one direction and for subsequently flowing a substantially equal amount of charge through said electrical current path in the opposite direction to form one cycle of charge flow, and
   c. indicator means responsive to said cycle at charge flow.

8. The apparatus of claim 7 wherein said indicator means comprises means for activating an audio frequency sound in response to the alternating flow of electrical charge.

9. The apparatus of claim 7 wherein said indicator means comprises means for activating a meter in response to the frequency of said alternating flow of electrical charge.

10. The apparatus of claim 7 wherein the means for flowing the charge in opposite directions comprises a voltage source, a capacitor, and circuit means for passing the current derived from said voltage source through said electrical current path and said capacitor, and means for switching said voltage source from the first voltage value to the second voltage value when the voltage across the capacitor reaches a first predetermined voltage level and for switching said voltage source from the second voltage value to the first voltage value when the voltage across the capacitor reaches a second predetermined voltage level.

11. The apparatus of claim 7 wherein the means for making electrical contact comprises a first and second electrode means, said first electrode means fixable to the animal tissue, said second electrode means being movable over the surface of the animal tissue and having a contacting area less than the fixed electrode.

* * * * *